(12) United States Patent
Pedersen

(10) Patent No.: US 6,344,012 B1
(45) Date of Patent: Feb. 5, 2002

(54) AUTOMATIC CONTINUOUSLY VARIABLE TRANSMISSION

(76) Inventor: Steven R. Pedersen, 2043 E. Soppa Rd. #339, Baltimore, MD (US) 21234

( * ) Notice: Subject to any disclaimer, the term of this patent is extended or adjusted under 35 U.S.C. 154(b) by 0 days.

(21) Appl. No.: 09/541,564

(22) Filed: Apr. 3, 2000

Related U.S. Application Data

(60) Provisional application No. 60/154,806, filed on Sep. 20, 1999.

(51) Int. Cl.$^7$ ............................................... F16H 15/12
(52) U.S. Cl. ............................................... 476/2; 476/9
(58) Field of Search ............................ 476/2, 9, 56, 58

(56) References Cited

U.S. PATENT DOCUMENTS 4,305,306 A * 12/1981 Adams ........................... 476/2
5,142,926 A * 9/1992 Huang ........................... 476/9

* cited by examiner

*Primary Examiner*—Richard M. Lorence

(57) ABSTRACT

A rotary power transmission device is disclosed in which output/input speed ratio is automatically and continuously adjusted as a function of both demand torque and demand speed by translation of a traction wheel upon the faces of two coaxial counter-rotating drive plates which are in concurrent tangential enforced contact with the wheel, with wheel serving as output. Translation of wheel is accomplished by applying opposed forces of a hydraulically actuated piston and a compression spring. Magnitude of hydraulic pressure upon piston is defined by combined action of pump speed and restriction of a flow control valve. By causing pump speed to be proportional to input speed, and valve restriction to be a function of an environmental variable such as inclination of a vehicle equipped with the transmission, traction wheel position and thus speed ratio is automatically adjusted as a function of both demand torque and demand speed. Traction wheel translation under high radial force is facilitated by use of rollers circumferentially distributed upon the periphery of traction wheel, which react radial forces while rolling upon drive plates in response to translation of traction wheel.

5 Claims, 6 Drawing Sheets

AUTOMATIC CONTINUOUSLY VARIABLE TRANSMISSION

RELATED APPLICATION

Provisional Application 60/154,806 filed Sep. 20, 1999.

BACKGROUND OF THE INVENTION

The present Invention is a rotary power transmission device providing an automatic and continuous, i. e., stepless, variation of input to output speed ratio in response to both demand speed and demand torque, particularly as required in vehicular applications. It is very desirable in such applications to maintain constant input speed and torque (power) of the prime mover as output speed and torque vary due to operator demand or to changing environmental conditions such as vehicle inclination, wind loading, or other external resisting forces. In the case of an engine driven vehicle, use of such a transmission can allow engine speed to be maintained at its most fuel-efficient operating point. For a human-powered vehicle, use of such a transmission can allow the operator to supply a comfortably maintainable power input while navigating hills, rough terrain, etc.

The present Invention allows this optimum matching of input to output power to be accomplished both continuously and automatically. Its basic operating principle is that of the well-known friction wheel and plate transmission, but improves upon such devices by constraining the wheel between two counter-rotating drive plates, both plates supplying torque input, with wheel being the output, and with no idler wheel or other intermediate device being used. With two diametrically opposite tangential contact interfaces rather than a single interface, this design causes the tractive forces applied to wheel to be balanced under high loading without undesired deflection of components, as is the tendency with a single tangential interface design. Enabling high loading at these contact points obviates another disadvantage of friction transmissions of the prior art, namely, slippage between drive and driven members due to the inability of prior designs to maintain adequate interfacial friction forces.

Certain continuously variable transmissions of the prior art attempt to control ratio as a function of either torque or speed, but not a combination of these. The present Invention improves upon the prior art by providing a novel and useful means of combining these variables in the following way. Traction wheel is moved and positioned upon drive plates by force imposed by a fluid actuated piston, the actuating pressure of which is modulated by combined action of pump speed and disposition of a flow control valve. By causing pump speed to be proportional to demand speed, and by causing the restriction of flow control valve to be defined by an environmental variable such as vehicle inclination, the combined effect is a continuous modulation of system pressure and thus speed ratio as a function of both demand speed and demand torque, as further described below.

Alternately, the present Invention allows for use of a manual flow control valve in parallel with said automatic valve, enabling, for example, the operator of a powered vehicle equipped with the transmission to manually modulate vehicle speed ratio range during operation.

Additionally, the present Invention improves upon the prior art by equipping traction wheel with rollers, constrained to and circumferentially distributed upon the wheel, which enable wheel to translate via rolling motion upon the drive plates while wheel is under high contact loading imposed by the drive plates, the wheel concurrently transmitting torque from drive plates to output shaft.

SUMMARY OF THE INVENTION

The object of the present Invention is to provide a rotary power transmission able to perform a continuous, i. e., stepless, variation of output to input speed ratio, and to perform this variation automatically in response to both demand speed and torque. This object is accomplished by a hydraulic control means which utilizes the combined action of a pump responsive to demand speed, and a flow control valve responsive to an environmental variable such as inclination.

Further object is to obtain, by use of the transmission within a vehicle or other powered device, improved efficiency by enabling the prime mover to maintain an optimum speed under a wide range of operating conditions.

Further object is to provide a continuously variable transmission having improved power transmitting capacity by providing an output traction wheel in concurrent tangential enforced contact with two counter-rotating drive plates, said design enabling generation of high tractive forces while balancing said forces without undesirable deflection of components.

Further object is to provide an improved mechanism for actuating continuous speed ratio variation with minimum internal effort while maintaining high tractive forces, specifically by use of rollers mounted upon traction wheel which enable said wheel to translate upon said drive plates via rolling action under high forces while maintaining output torque traction.

BRIEF DESCRIPTION OF THE DRAWINGS

FIG. 2(a) is an isometric view of the transmission, exploded to display and enumerate the functional components;

FIG. 2(b) displays a magnified view of a portion of FIG. 2a;

DESCRIPTION OF THE INVENTION

Figure 1:
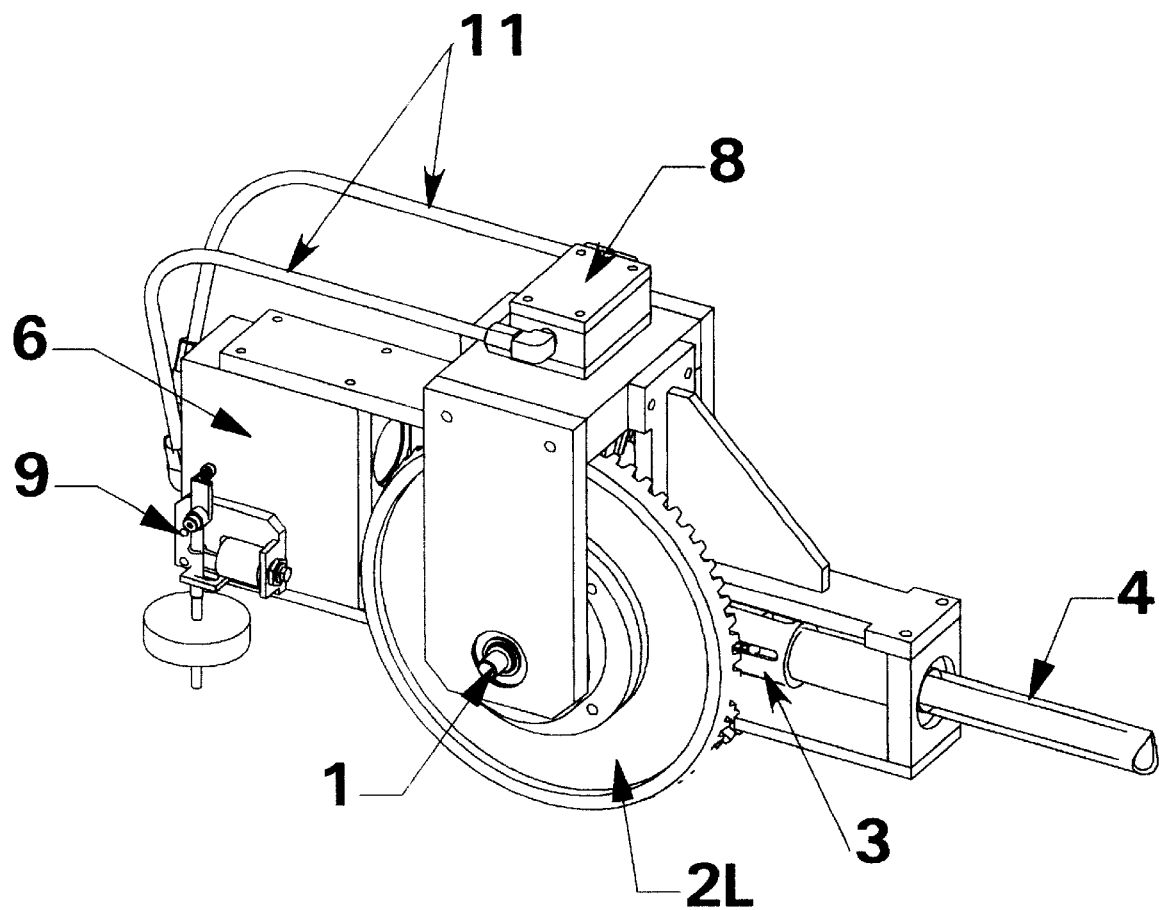
FIG. 1 is an isometric view of the transmission in assembled form.

Referring to FIGS. 1 and 2, the Invention is a rotary power transmission device having an input shaft 1 which is connected via an overrunning clutch 16 to one of two bevel gears 2L, 2R. Bevel gears are mounted coaxially upon input shaft and in opposed orientation. Bevel gear 2L is in mesh through bevel pinion 10 with bevel gear 2R, and thus rotates at the same speed and opposite direction to gear 2R.

Located between gears 2L and 2R is torque wheel 3, whose axis intersects and is normal to that of input shaft 1. Torque wheel tangentially engages drive plates 20, which are rigidly attached to the inboard faces of gears. Drive plates may be composed of a metal, such as bearing steel, or may be composed of mineral fibers or a polymeric material such as high durometer polyurethane. This engagement is established in such a way that the two contact points between torque wheel and drive plates develop frictional forces and/or elastic deformations sufficient to transmit torque to the torque wheel. Thus when drive plates are rotated, they cause wheel to rotate at a speed determined by the axial location of the contact points upon the plates. An output shaft 4 is attached to wheel, as detailed below.

Coaxial with torque wheel 3 is piston 5. Piston is axially displaced by pressure in cylinder block 6. When so actuated, piston bears upon wheel through thrust bearing 3e and displaces the contact points between drive plates 20 and wheel, thus changing the rotary speed of wheel. By this means, a continuous, i. e., stepless, range of speed ratios is obtained.

Coaxial with torque wheel 3 is output shaft 4. This shaft is connected to wheel via pins, splines, or any similar means which enable concurrent axial displacement and torque transmittal. Within output shaft is spring 3g which reacts the axial force exerted by piston 5. Spring may be any mechanical or fluid type which exhibits an increasing resistive force upon axial compression. It is the combined action of these forces (piston and spring), each acting oppositely to the other coaxially upon torque wheel, which defines the instantaneous location of wheel relative to plates 20 during transmission operation.

Pump 8 provides flow of a hydraulic fluid to cylinder block 6 via tubing 11 or any similar fluid channel. This pump may be any kind of positive displacement type. Pump is driven by shaft connected to pinion bevel gear 10, which in turn is driven by bevel gear 2L as described above. By means of overrunning clutch 16, input power may be interrupted while transmission continues in motion, transmission being back-driven by torque delivered through output shaft 4 and torque wheel 3. Thus pump operation is continuous during transmission operation, with pump speed being proportional to the greater of input speed or output speed.

Figures 2A, 2B:
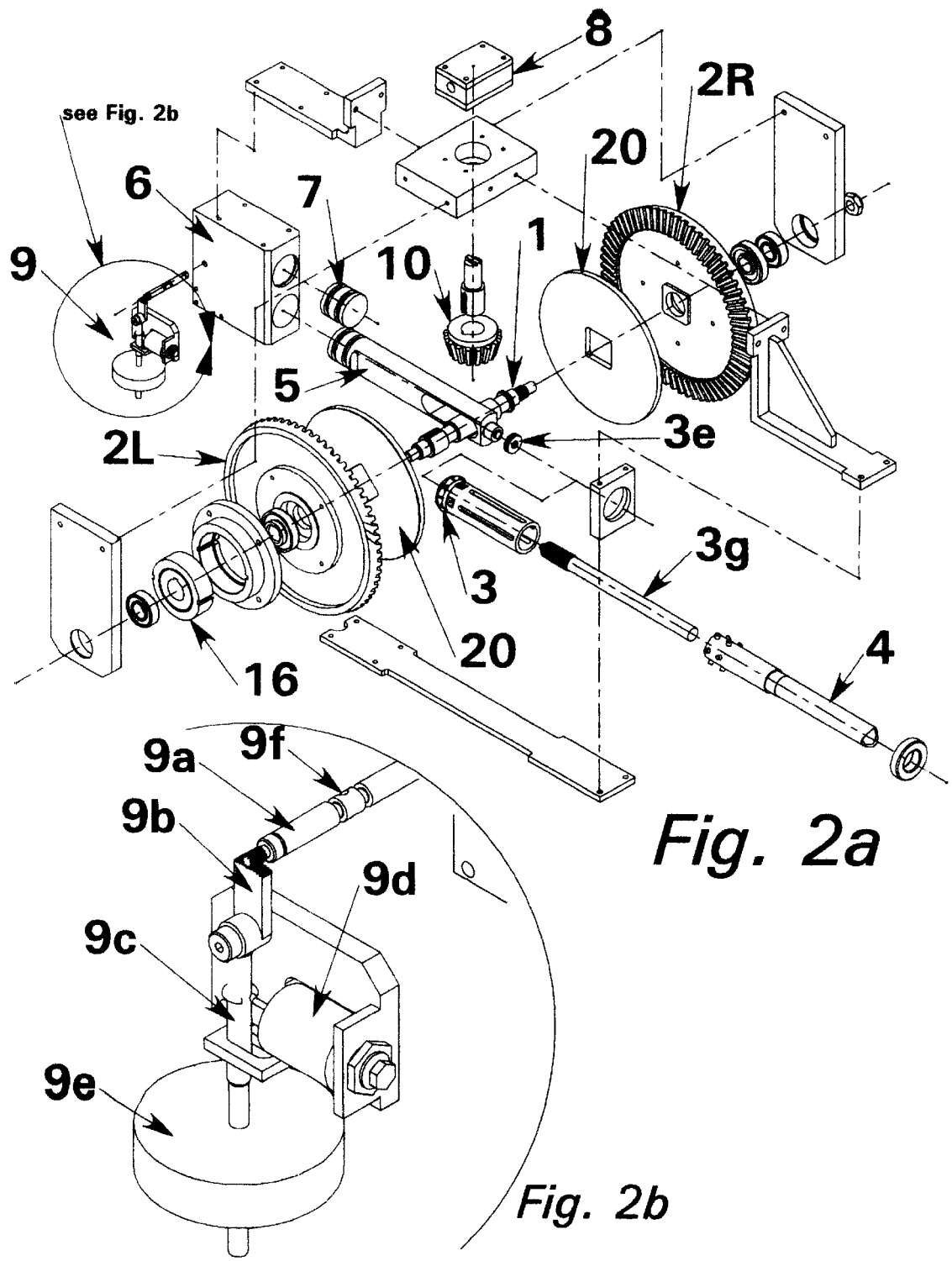

Referring to FIG. 2b, a flow control valve 9 is contained within the hydraulic circuit, as is a fluid reservoir, located in cylinder block 6 and fitted with free-floating piston 7. Shaft 9a is fitted with a cross-drilled circular orifice 9f. When shaft is installed in cylinder block, this orifice aligns with a circular orifice in block, forming a fluid channel between piston cylinder and reservoir cylinder. When shaft is rotated, said alignment is changed and effective hydraulic diameter of this channel is varied, causing a variable restriction of fluid flow from piston cylinder to reservoir cylinder.

Pressure in cylinder block 6 acting on piston 5 is modulated by combined action of both pump speed and valve restriction, system pressure being an increasing function of pump speed if flow control valve 9 is closed or restricted, but may be reduced by opening valve, allowing fluid to return to reservoir and thus reducing system pressure. By this combined action of pump and valve, the force applied upon torque wheel 3 by piston is varied during operation, causing wheel to translate upon drive plates 20 in response to variations in both demand speed and torque, resulting in a continuously, i. e., steplessly, variable input/output speed ratio.

Flow control valve 9 is automatically actuated by a continuous environmental variable, such as inclination, by addition of a pendulum rod 9c with bob 9e, and dashpot 9d. Attached to rod is gear sector hub 9b which meshes with pinion on shaft 9a. When, for example, an incline is encountered by a vehicle equipped with the present Invention, the pendulum rotates relative to cylinder block 6 to maintain alignment with the gravitational field, thus rotating shaft through mesh with gear sector hub. This action has the effect of increasing the effective hydraulic diameter of the valve orifice, allowing fluid to return to reservoir, reducing pressure in cylinder block 6 and allowing torque wheel 3 to displace radially toward center of drive plates 20 to provide a low speed, high torque output. Upon vehicle navigation of the incline, valve returns to its initial position, reducing the effective hydraulic diameter of the valve orifice, thus restricting fluid flow and increasing pressure in cylinder block, thereby displacing torque wheel radially toward periphery of plates to provide a high speed low torque output.

Figures 3A, 3B:
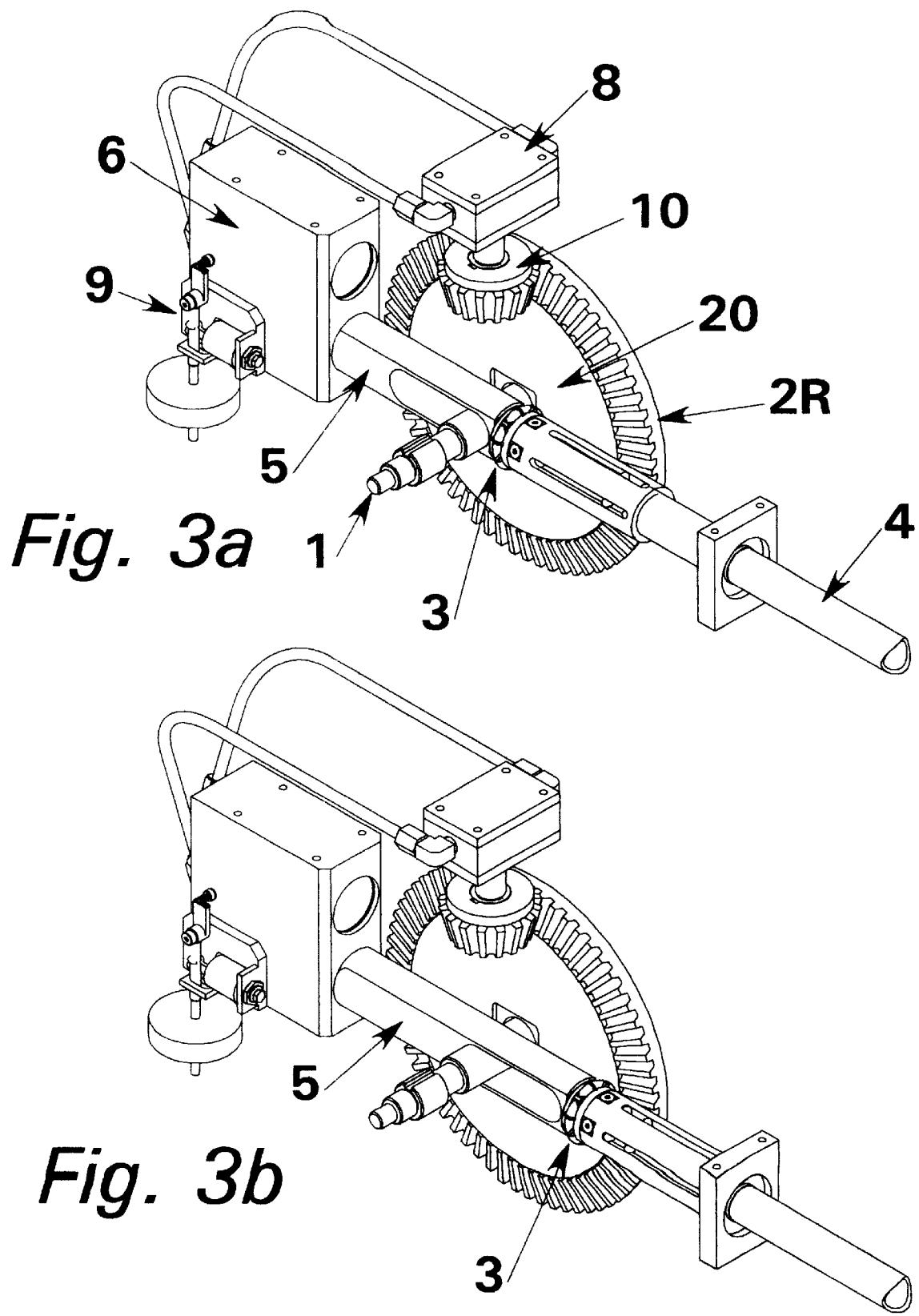
FIGS. 3(a) and (b) illustrate range of motion of the functional components, with certain components removed for clarity of observation.

Referring to FIGS. 2 and 3, in a motorized vehicle having a transmission of this description, automatic variation of speed ratio is obtained as follows. From a vehicle standing start, transmission cylinder pressure is low, and torque wheel 3, under force of spring 3g, is positioned as shown in FIG. 3a, and a low speed high torque output is provided. As effort of the prime mover is applied, vehicle accelerates to cruise speed, cylinder pressure increases, causing piston 5 to force torque wheel 3 to radially displace toward periphery of drive plates 20, as shown in FIG. 3b, providing a high speed, low torque output. When greater tractive effort is needed, as upon an incline, valve 9 opens, as described above, thus reducing cylinder pressure which causes torque wheel, as forced by spring 3g, back toward the center of drive plates, providing a low speed high torque output. This ratio transition is accomplished without operator input, and thus is automatic.

Figure 4A:
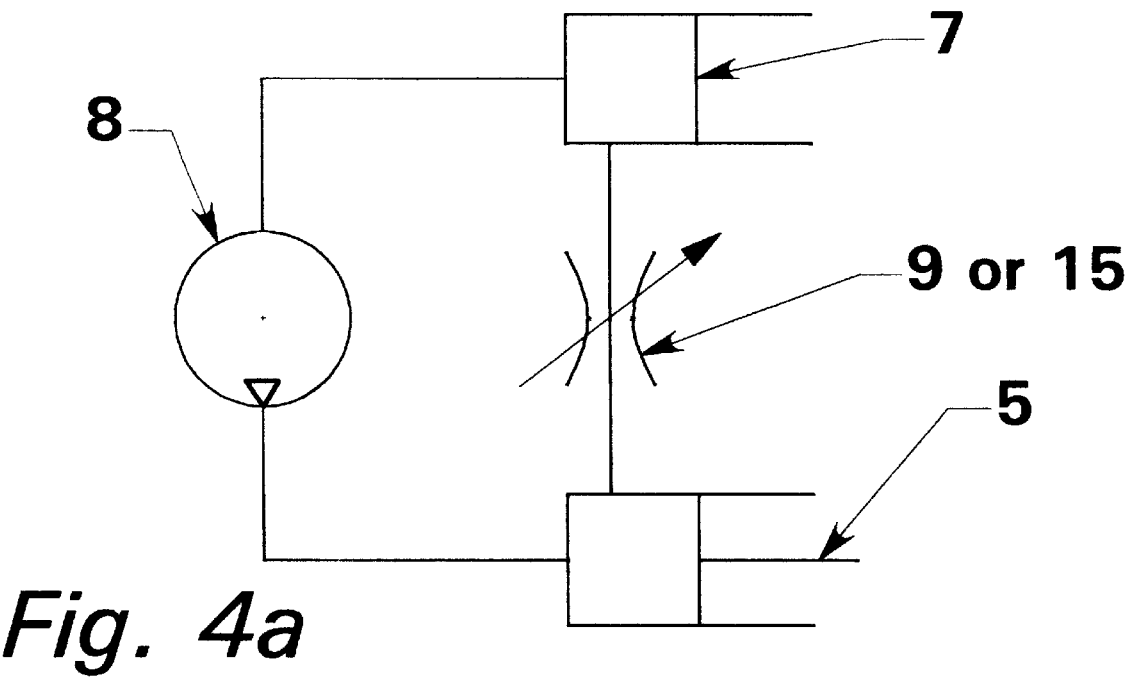
FIGS. 4(a) and (b) schematically display two variants of the transmission hydraulic system.
Figure 4B:
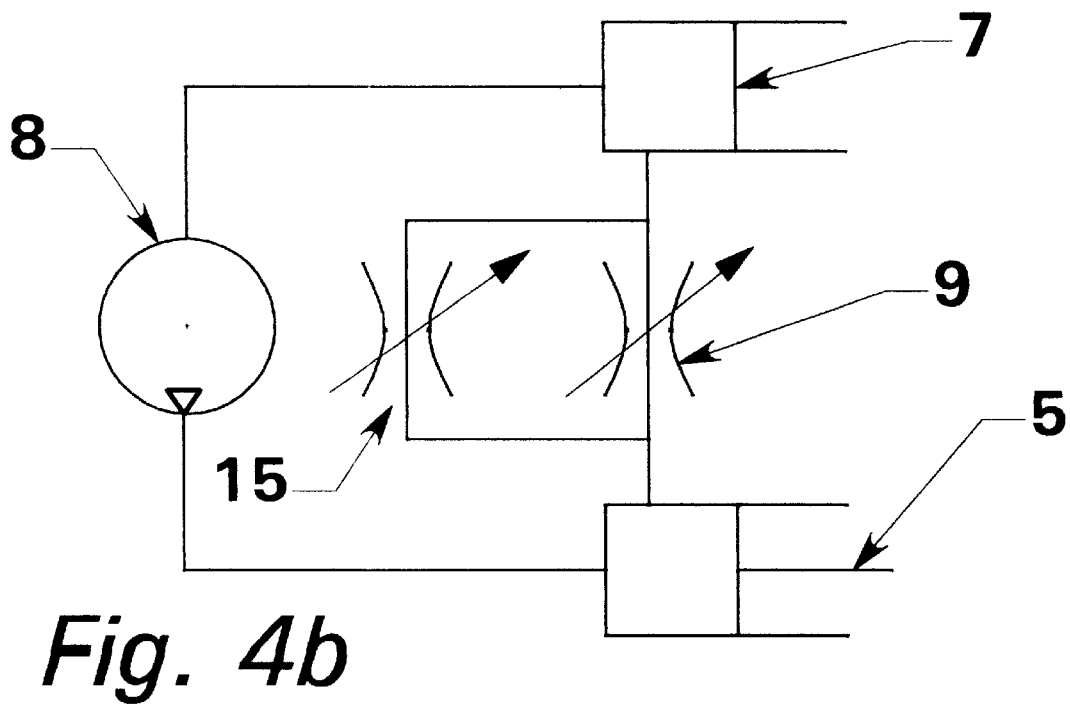

Referring to the hydraulic circuit illustrated in FIG. 4a, either automatic flow control valve 9 or manually actuated flow control valve 15 is used, providing either fully automatic or fully manual control of speed ratio. FIG. 4b illustrates an alternate circuit in which both valves are used in parallel. In this latter circuit, the manually actuated valve may be used by an operator to modulate the action of the automatically actuated valve, thus obtaining a desired vehicle performance range in response to the environmental variable.

With transmission fitted with overrunning clutch 16 (FIG. 2a), vehicle motive power may derive from an intermittent source, such as a person actuating input shaft 1 fitted with pedal cranks, as in a bicycle. Such a vehicle would exhibit an automatic and continuously variable speed ratio under all conditions of vehicle speed or inclination, enabling operator to provide motive power intermittently and at a comfortable and ergonomically optimum level.

Figure 6A:
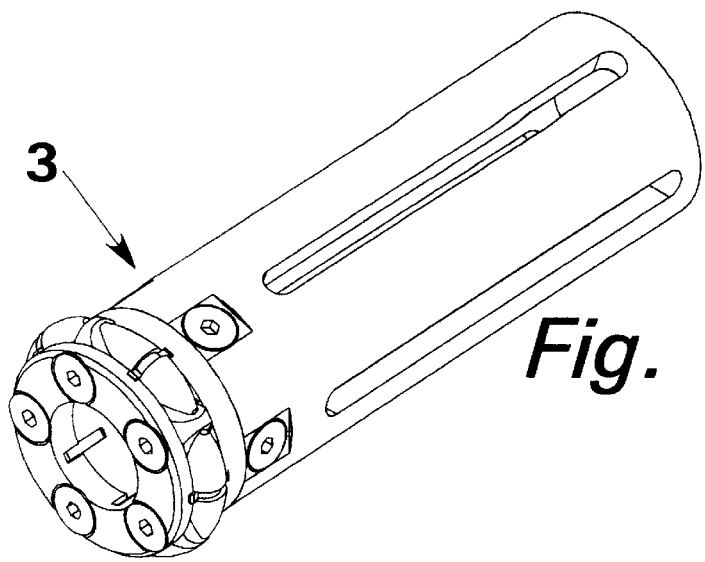
FIG. 6(a) is an isometric view of traction wheel.
Figure 6B:
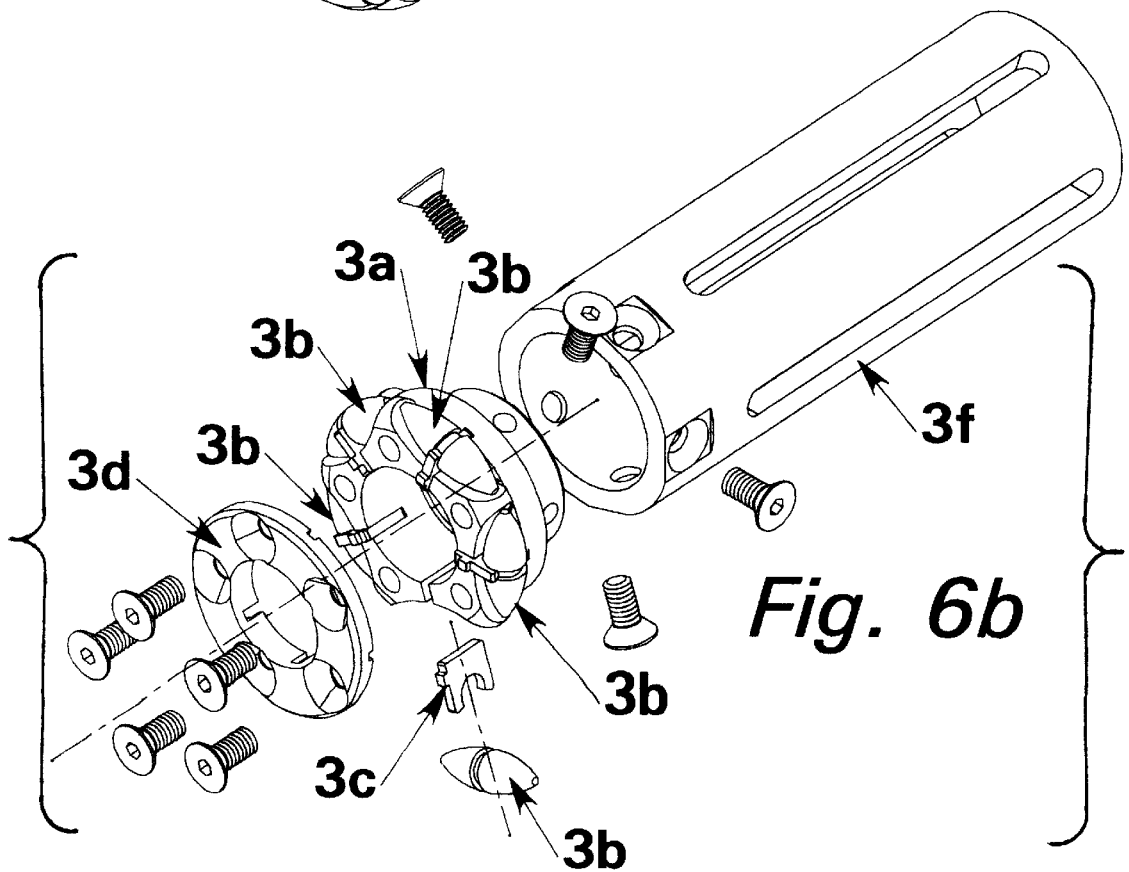
FIG. 6(b) displays traction wheel as an exploded view to enumerate the functional components.

Referring to FIGS. 6a and b, torque wheel 3 is described. Torque wheel consists of a hub 3a on which a circumferentially distributed array of rollers 3b are attached by means of retainers 3c, each of which captivate one roller and are in turn captivated between hub and cap 3d. These rollers freely rotate on their major axis, but are constrained from other displacement by said retainers. Component 3f is rigidly attached to hub and provides torque transmission via pins, keys, splines, or equivalent means to output shaft 4 while concurrently enabling translation of wheel.

Figure 5A:
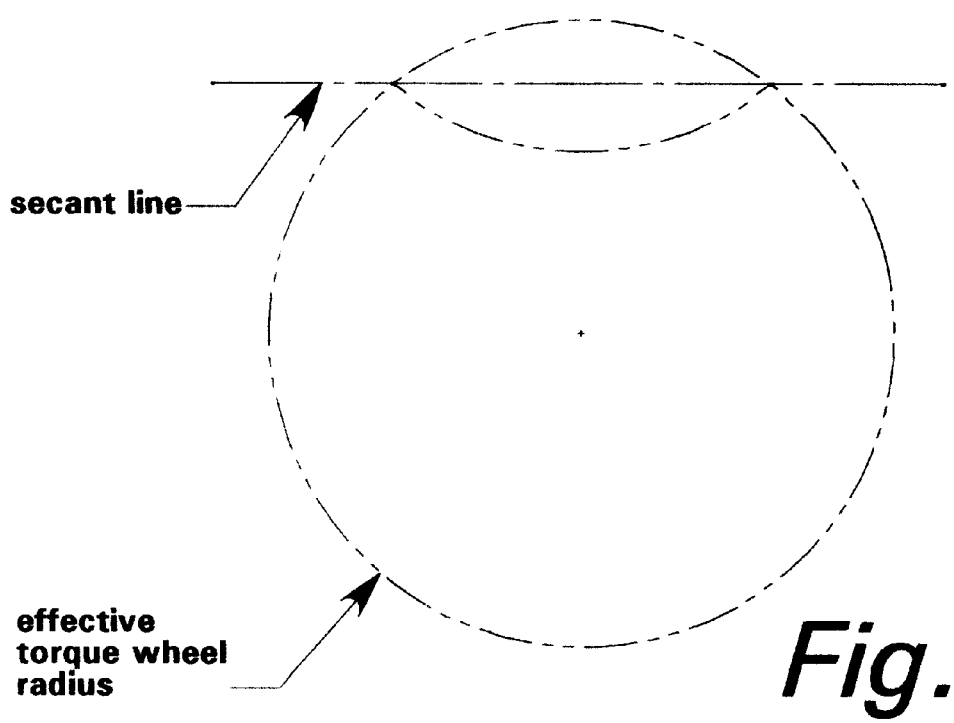
FIG. 5(a) illustrates basic method of generating surface geometry of the traction roller.
Figure 5B:
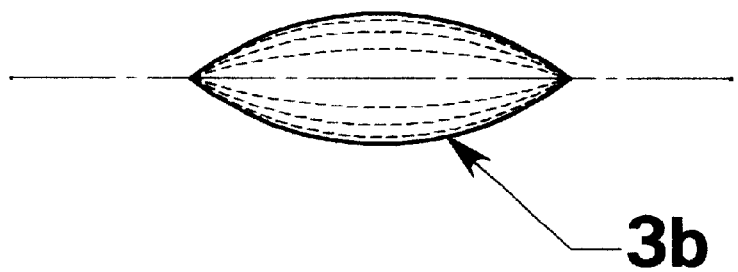
FIG. 5(b) displays resultant roller geometry obtained by application of FIG. 5(a)

As shown in FIGS. 5a and b, rollers 3b exhibit a surface geometry as obtained by revolving an arc about a secant line subtending the arc, the radius of which is equal to the effective torque wheel radius. Rollers may also exhibit any texture or other geometric feature upon their increases frictional traction forces when placed in loaded contact with drive plates 20.

In operation, contact between torque wheel 3 and drive plates 20 is established through rollers 3b. When the axial location of torque wheel is held constant, rollers act as rigid, non-rotating bearing elements. Torque is transmitted from drive plates to torque wheel by means of tangential frictional forces generated between plates and rollers. When torque wheel is axially displaced, rollers accommodate this displacement by rolling upon plates, while concurrently maintaining tangential frictional engagement with plates. This rolling action allows axial displacement of torque wheel to be accomplished with minimum applied force, while high tractive forces between wheel and plates are maintained, and while full torque transmission is maintained during ratio variation.

What is claimed is:

1. A rotary power transmission device having an output shaft located between two coaxial counter-rotating plates, said shaft axis intersecting with and normal to said plate axis, and fitted with a traction wheel, said wheel being in simultaneous and enforced contact with both of said plates at diametrically opposite points on periphery of wheel, said wheel being engaged with plates by friction and constrained to rotate in ratio to rotation of plates, magnitude of said ratio being determined by location of contact points of wheel upon plates, said plates rigidly mounted upon bevel gears, said gears being of equal size, and constrained to rotate at equal speed and opposite direction by being in common mesh with an intermediate bevel gear, said intermediate gear driving a positive-displacement fluid pump, said pump supplying fluid energy to a hydraulic circuit consisting of a cylinder fitted with a powered piston, a fluid reservoir fitted with a free-floating piston, and a flow control valve, actuating input of said valve being any continuous environmental variable.

2. A rotary power transmission device of claim 1, utilizing a manually actuated flow control valve, by itself or in parallel with said flow control valve actuated by any continuous environmental variable.

3. A rotary power transmission device of claim 1, in which location of contact points between said wheel and plates is adjustable and may be caused to translate upon plates by opposed forces exerted by said powered piston and a spring, magnitude of said piston force being varied by combined action of pump speed and said flow control valve, magnitude of said spring force being an increasing function of wheel displacement, said opposed forces determining the location of contact points between wheel and plates, said translation causing speed ratio between plates and wheel to vary, enabling said device to exhibit a continuous range of speed ratios.

4. A rotary power transmission device of claim 1, in which said traction wheel is fitted with several rollers uniformly and circumferentially distributed and constrained upon periphery of wheel, surface of each roller being described by revolving an arc subtended by a secant line about said secant line, radius of said arc being equal to the effective radius of wheel, rollers frictionally engaging plates, and able to transmit torque from plates to output shaft, and free to roll upon their axes, said rolling action enabling translatory displacement of wheel upon plates when acted upon by opposed forces of said piston and spring.

5. A rotary power transmission device of claim 4, in which said plates and/or rollers exhibit any surface texture, treatment, shape, or geometric feature supplemental to that described under claim 4, which causes increase in friction forces generated at the contact interface between said plates and rollers.

* * * * *